(12) United States Patent
Vasquez et al.

(10) Patent No.: US 8,699,697 B2
(45) Date of Patent: Apr. 15, 2014

(54) PROVIDING CALLER-SPECIFIC INFORMATION

(75) Inventors: Juan Vasquez, Tampa, FL (US); Prashant B. Desai, Land O Lakes, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 302 days.

(21) Appl. No.: 12/848,398

(22) Filed: Aug. 2, 2010

(65) Prior Publication Data

US 2012/0027184 A1 Feb. 2, 2012

(51) Int. Cl.
*H04M 3/00* (2006.01)

(52) U.S. Cl.
USPC ............. 379/266.01; 379/114.13; 379/211.02

(58) Field of Classification Search
USPC .................. 379/88.01–88.04, 88.23, 209.01, 379/114.13, 265.01–266.1, 211.01, 211.02
See application file for complete search history.

(56) References Cited

U.S. PATENT DOCUMENTS

| 5,946,388 | A | * | 8/1999 | Walker et al. | 379/266.01 |
| 6,016,336 | A | * | 1/2000 | Hanson | 379/88.23 |
| 6,493,437 | B1 | * | 12/2002 | Olshansky | 379/114.13 |
| 2005/0163302 | A1 | * | 7/2005 | Mock et al. | 379/211.02 |

* cited by examiner

*Primary Examiner* — Md S Elahee

(57) ABSTRACT

A method may include receiving a call from a caller and interacting with the caller, via an interactive voice response (IVR) unit, to identify first information associated with a reason for the call. The method may also include accessing a database storing second information associated with the caller, identifying third information to be provided to the caller based on the stored second information and providing the third information to the caller prior to forwarding the call to an agent.

18 Claims, 6 Drawing Sheets

PROVIDING CALLER-SPECIFIC INFORMATION

BACKGROUND INFORMATION

Interactive voice response (IVR) systems are frequently used to answer calls and allow callers to obtain information. For example, businesses often use IVR systems to allow a caller to obtain information without human intervention.

Frequently, however, the IVR system determines that a caller requires human assistance. In these cases, the IVR system queues the call for transfer to a human agent. While the call is queued, the caller typically hears music played by the IVR system until the call is answered by an agent.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to providing information of interest to callers. In one implementation, announcements that may include offers for goods, services, upgrades to existing goods/services, etc., may be provided to a caller while the call is queued and waiting to be answered by a human agent. The information provided to the caller may be based on profile information associated with the particular caller. The information may also indicate that the user may select a particular offer by voicing a selection and/or entering a keypad input. If the offer is selected, information associated with the offer may be provided to an agent's workstation for display when the agent answers the call.

Figure 1:
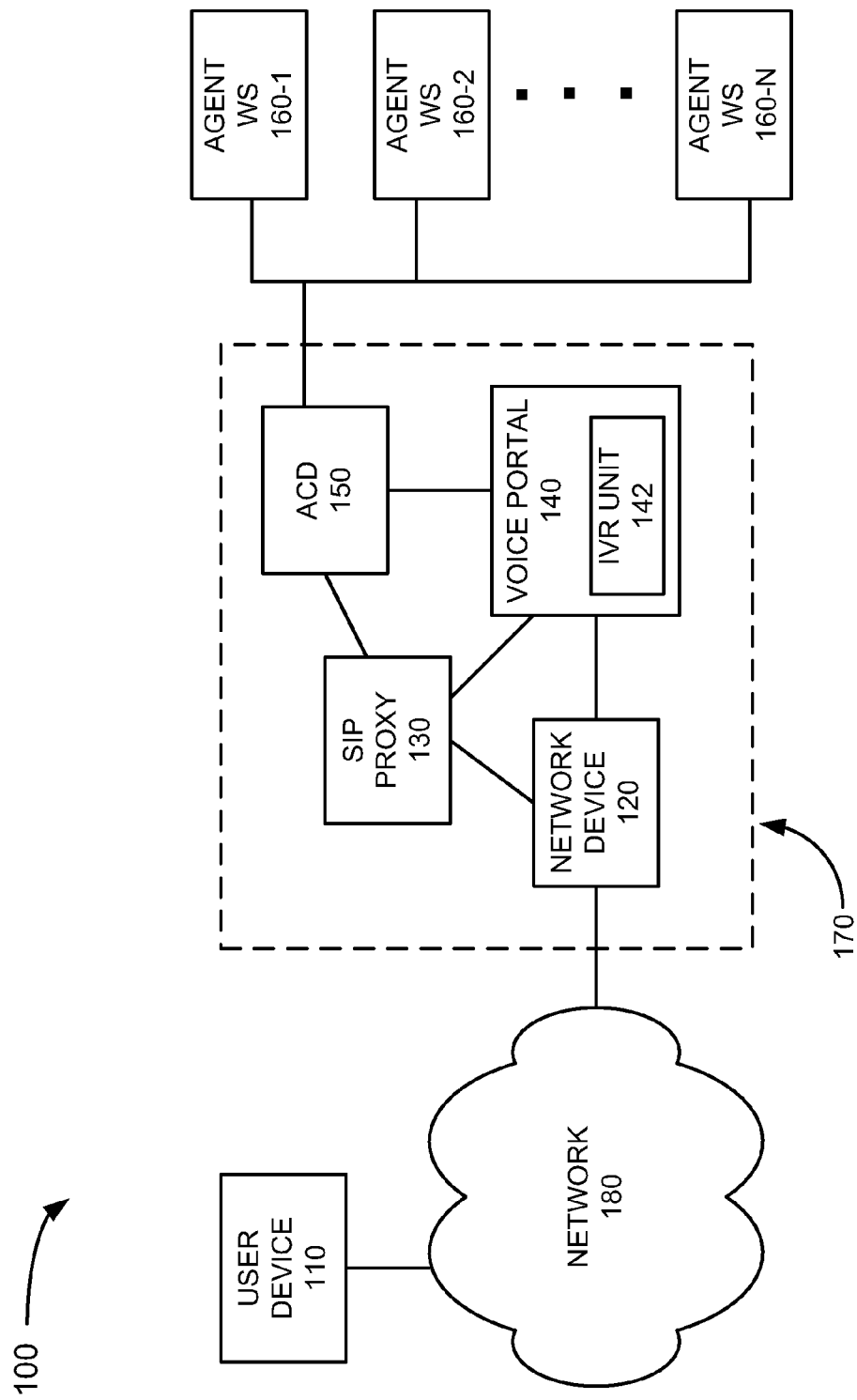
FIG. 1 illustrates an exemplary network in which systems and methods described herein may be implemented.

FIG. 1 is a block diagram of an exemplary network 100 in which systems and methods described herein may be implemented. Referring to FIG. 1, network 100 includes user device 110, network device 120, session initiation protocol (SIP) proxy 130, voice portal 140, automatic call distributor 150, agent workstations (WSs) 160-1 through 160-N (referred to collectively as agent WSs 160 or individually as agent WS 160) and network 180.

User device 110 may include any type of communication or computation device that is capable of transmitting and receiving voice signals and/or data to/from a network, such as network 180. For example, user device 110 may include any standard telephone, cordless telephone, cellular telephone, or other type of conventional telephone that interfaces with a public switched telephone network (PSTN) and/or wireless network to place and receive telephone calls. User device 110 may also include any client, such as a computer device, a web-based appliance, etc., that is configured to provide telephone functions using, for example, voice over Internet protocol (VoIP). For example, user device 110 may include a SIP-based telephone device. In this case, the SIP-based telephone device may take the form of a standalone device, e.g., a SIP telephone designed and configured to function and appear like a conventional telephone. A SIP-based telephone device may also include a software client that may run, for example, on a conventional personal computer (PC), laptop computer or other computing device.

Network device 120 may include one or more devices, such as a gateway, that allow divergent transport networks to communicate and cooperatively carry traffic. For example, network device 120 may include a gateway that provides for interoperation at two levels, e.g., between different signaling schemes and between different media forms. For example, network device 120 may adapt between SS7 signaling of network 180 and session initiation protocol (SIP), H.323 protocols or other protocols (e.g., Internet protocols (IPs) or Internet based protocols) used by other devices in network 100. In one implementation, network device 120 may convert time division multiplexed (TDM) encoded voice signals to a packetized data stream suitable for transport to and processing by a proxy device, such as SIP proxy 130.

Network device 120 may also include one or more session border controllers (SBCs) that provide control of the boundary between different service provider networks, provide signaling protocol inter-working between an IP-based network and other service provider networks, control the transport boundary between service provider networks, and provide usage metering and Quality of Service (QoS) measurements for media flows. In one implementation, network device 120 may correspond to an ingress point to SIP proxy 130. For example, network device 120 may receive a VoIP call from user device 110 and forward the VoIP call to SIP proxy 130.

SIP proxy 130 may include a server/computing device that is able to receive data from network device 120 and forward the received data to an appropriate voice portal, such as voice portal 140 using SIP protocol. In other implementations, SIP proxy 130 may be able to receive and forward data via another protocol, such as H.323.

Voice portal 140 may represent a front end device associated with, for example, a call center. In an exemplary implementation, voice portal 140 may include interactive voice response (IVR) unit 142 that interacts with callers to obtain information associated with the call. For example, IVR unit 142 may include speech software/hardware that provides voice commands to a caller to obtain information. IVR unit 142 may also include speech recognition hardware/software that receives voice responses from the caller and identifies what the caller has voiced. If necessary (e.g., the call cannot be handled without human intervention), voice portal 140 may forward the call to an appropriate agent WS, such as one of agent WSs 160. Voice portal 140 may also interface with automatic call distributor (ACD) 150 that distributes calls among a number of agent workstations 160.

ACD 150 may distribute calls received at voice portal 140 to one of agents WSs 160-1 through 160-N. ACD 150 is illustrated as being located externally from voice portal 140. In some implementations, ACD 150 may be part of voice portal 140. In each case, ACD 150 may forward calls to an available one of the agent WSs 160. ACD 150 may also provide announcements to the caller while the call is queued and waiting for the agent to answer the call, as described in detail below.

Agent WSs 160 may represent any conventional workstation/computer and operator used to handle calls from callers that require human intervention. In an exemplary implementation, agent WSs 160 may be associated with voice portal 140 and ACD 150. In addition, in an exemplary implementation, agent WSs 160 may be connected to ACD 150 and/or voice portal 140 via a network, such as network 180. In alternative implementations, agent WSs 160 may be connected directly to ACD 150 and/or voice portal 140, connected via a LAN, connected via a private network, etc.

Agent WSs 160 may include a workstation or computer, such as a personal computer or laptop. Agent WSs 160 may also include any device capable of performing IP based messaging, such as VoIP, to transmit voice and/or text. Agent WSs 160 may also include any conventional telephone device (not shown) to place and receive telephone calls. For example, the telephone device may be a standard telephone, a cordless telephone, a cellular telephone or any other type of conventional telephone. The telephone device may also include any type of device that is capable of transmitting and receiving voice signals to/from a data network. For example, the telephone device may include any client, such as a computer device, a web-based appliance, etc., that is configured to provide telephone functions. The telephone device may, for example, be a SIP-based telephone device. In this case, the SIP-based telephone device may take the form of a standalone device, e.g., a SIP telephone designed and configured to function and appear like a conventional telephone. A SIP-based telephone device may also include a software client that may run, for example, on a conventional PC, laptop computer or other computing device.

Network 180 may include one or more wired, wireless and/or optical networks that are capable of receiving and transmitting data and voice signals. For example, network 180 may include one or more public switched telephone networks (PSTNs) or other type of switched network. Network 180 may also include one or more wireless networks and may include a number of transmission towers for receiving wireless signals and forwarding the wireless signals toward the intended destination. Network 180 may further include one or more satellite networks, one or more packet switched networks, such as an Internet protocol (IP) based network, a local area network (LAN), a wide area network (WAN), an intranet, the Internet, or another type of network that is capable of transmitting telecommunications traffic (e.g., VoIP traffic). For example, network 180 may include one or more SIP-based networks, one or more H.323/H.225-based networks, or any other type of packet switched network that is capable of transmitting traffic from a source device to a destination device.

The exemplary configuration illustrated in FIG. 1 is provided for simplicity. It should be understood that a typical network may include more or fewer devices than illustrated in FIG. 1. For example, one user device 110, one network device 120, one SIP proxy 130, one voice portal 140, one ACD 150 and one network 180 are shown for simplicity. It should be understood that network 100 may include a large number (e.g., hundreds or thousands) of user devices, work stations, a number of other networks and/or voice portals. In addition, additional switching devices, routing devices, etc., involved in routing calls and data may be included in network 100.

Further, various functions are described as being performed by particular components in network 100. In other implementations, various functions described as being performed by one device may be performed by another device or various functions described as being performed by multiple devices may be combined and performed by a single device. In addition, in an exemplary implementation, the components illustrated within dotted box 170 in FIG. 1 (i.e., network device 120, SIP proxy 130, voice portal 140 and ACD 150) may be located within the same data center. In one implementation, the data center may be associated with a commercial or retail related service, such as providing telephone, cable television (TV) and/or Internet service, ordering new telephone, cable TV and/or Internet related features for an existing service, etc.

Figure 2:
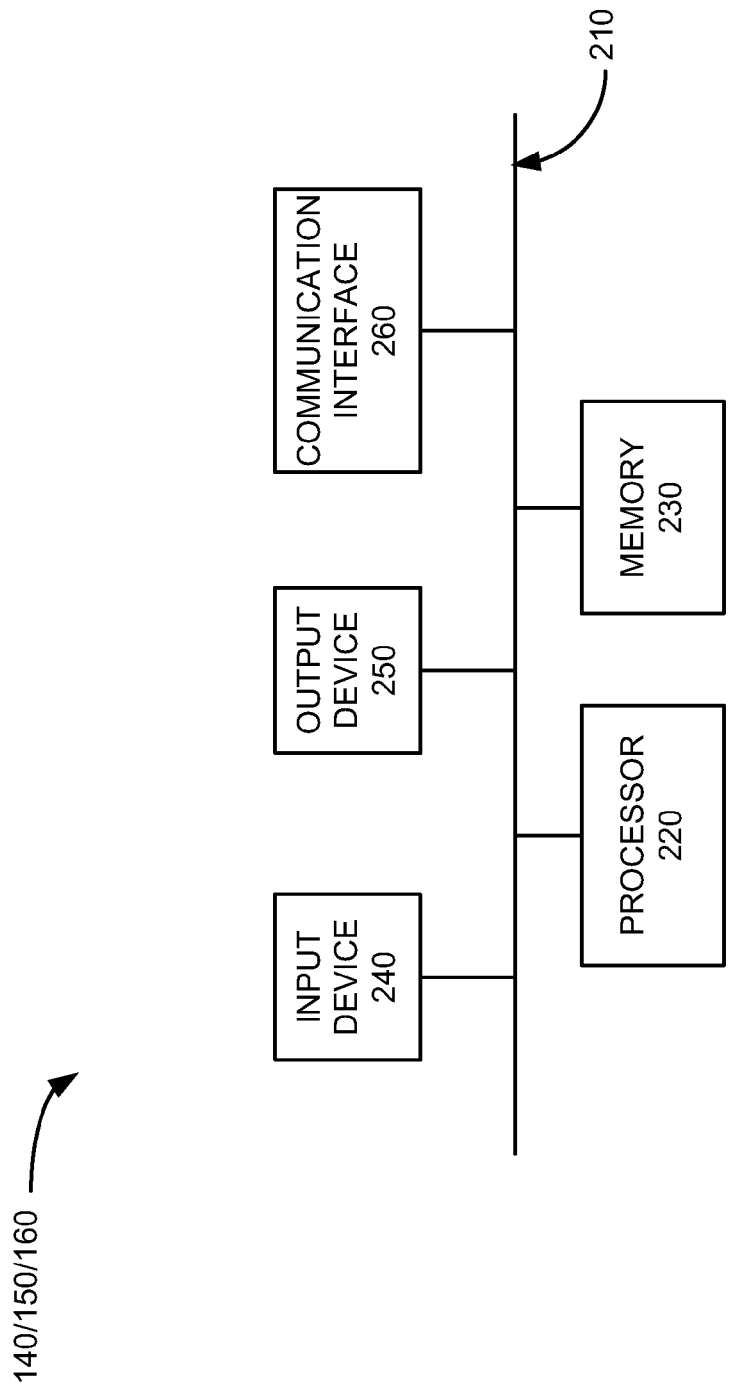
FIG. 2 illustrates an exemplary configuration of one or more of the components of FIG. 1.

FIG. 2 illustrates an exemplary configuration of voice portal 140. Other devices in network 100, such as ACD 150 and workstations 160, may be configured in a similar manner. Referring to FIG. 2, voice portal 140 may include bus 210, processor 220, memory 230, input device 240, output device 250 and communication interface 260. Bus 210 may include a path that permits communication among the elements of voice portal 140.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SDD). Memory 230 may also include a magnetic and/or optical recording medium (e.g., a hard disk) and its corresponding drive.

Input device 240 may include a mechanism that permits a user to input information to voice portal 140, such as a keyboard, a keypad, a mouse, a pen, a microphone, a touch screen, voice recognition and/or biometric mechanisms, etc. Output device 250 may include a mechanism that outputs information to the user, including a display, a printer, a speaker, etc.

Communication interface 260 may include a transceiver that voice portal 140 (or ACD 150, WSs 160) may use to communicate with other devices (e.g., network device 120, SIP proxy 130, ACD 150, etc.) via wired, wireless or optical mechanisms. Communication interface 260 may also include one or more radio frequency (RF) transmitters, receivers and/or transceivers and one or more antennas for transmitting and receiving RF data via network 180. Communication interface 260 may also include a modem or an Ethernet interface to a LAN or other mechanisms for communicating with elements in a network, such as network 180 or another network.

The exemplary configuration illustrated in FIG. 2 is provided for simplicity. It should be understood that voice portal 140, ACD 150 and WSs 160 may include more or fewer devices than illustrated in FIG. 2. In an exemplary implementation, voice portal 140 (or ACD 150, WS 160) may perform operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
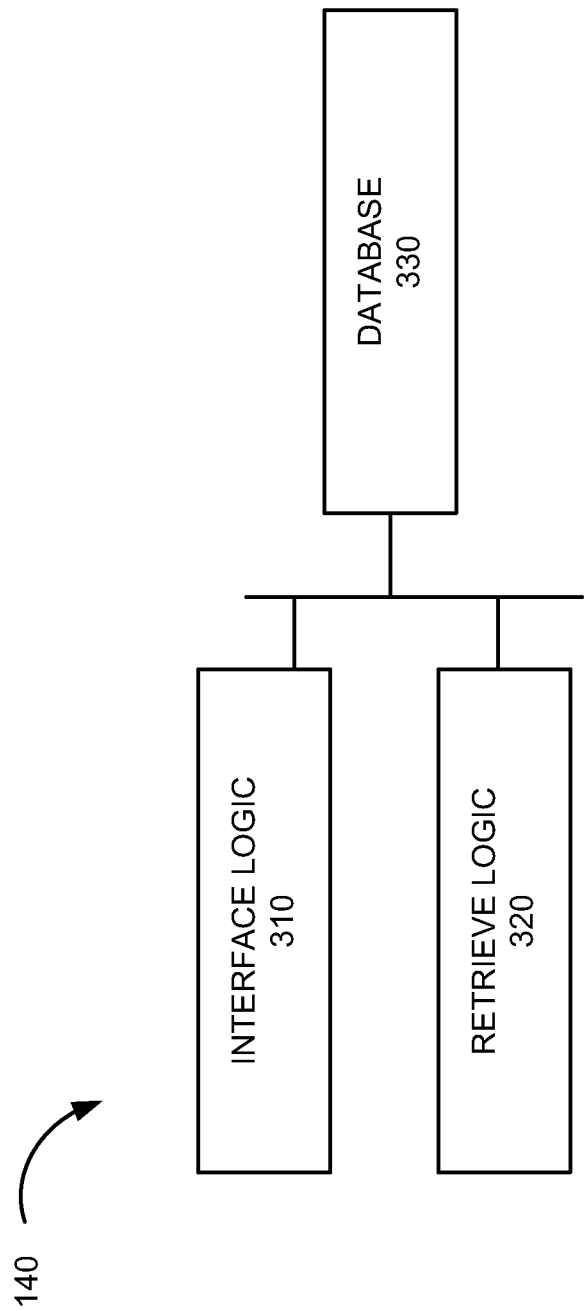
FIG. 3 illustrates an exemplary configuration of logic components implemented in one of the components of FIG. 1.

FIG. 3 is a functional block diagram of voice portal 140 according to an exemplary implementation. The logical blocks illustrated in FIG. 3 may be implemented in software, hardware, or a combination of hardware and software. For example, some or all of the logical blocks illustrated in FIG. 3 may be implemented by processor 220 executing instructions stored in memory 230. In one implementation, the logical blocks illustrated in FIG. 3 are implemented in IVR unit 142. It should be understood that the logical blocks illustrated in FIG. 3 may be located externally from voice portal 140 in other implementations.

Referring to FIG. 3, voice portal 140 may include interface logic 310, retrieve logic 320, and database 330. Interface logic 310 may include a front end that receives calls from callers (e.g., via user device 110). Interface logic 310 may determine the telephone number associated with an incoming call. For example, interface logic 310 may include an automatic number identification (ANI) system that determines the telephone number associated with an incoming call. In some implementations, interface logic 310 may also include logic to identify an address, such as an IP address, associated with an incoming call made from a computer device. Interface logic 310 may further include speech processing logic that performs speech recognition on voice data input from a caller.

Retrieve logic 320 may use the caller's telephone number to determine the caller's name and/or other information associated with the caller. For example, retrieve logic 320 may access a database (e.g., database 330) of caller telephone numbers and corresponding names. Alternatively, the database of telephone numbers and corresponding names may be stored on a device located externally from voice portal 140.

Retrieve logic 320 may also access database 330 to retrieve information associated with the particular caller. For example, retrieve logic 320 may use the caller's telephone number and/or name as an index to database 330 to retrieve information, such as customer profile information associated with that particular caller, as described in more detail below.

Database 330, as described above, may store information associated with customers. For example, database 330 may store customer telephone numbers and corresponding names and addresses associated with the customers. Database 330 may further include information regarding a caller's level of service (e.g., subscription level associated with a product or service offered by a service provider associated with voice portal 140), or other customer profile related information associated with the particular caller that identifies products, services, etc., provided to the caller by the service provider or merchant associated with voice portal 140. This information may be used to provide specific information of interest to a caller while the caller is on hold waiting for an agent at one of agent WSs 160 to answer the call.

For example, retrieve logic 320 may access database 330 to identify a customer's level of service or other customer profile-related information associated with the caller/customer. Retrieve logic 320 may use the customer profile information to identify product offers, upgrades, or other information of interest to the caller in an attempt to upsell or cross-sell additional products/services, as described in more detail below.

Figure 4:
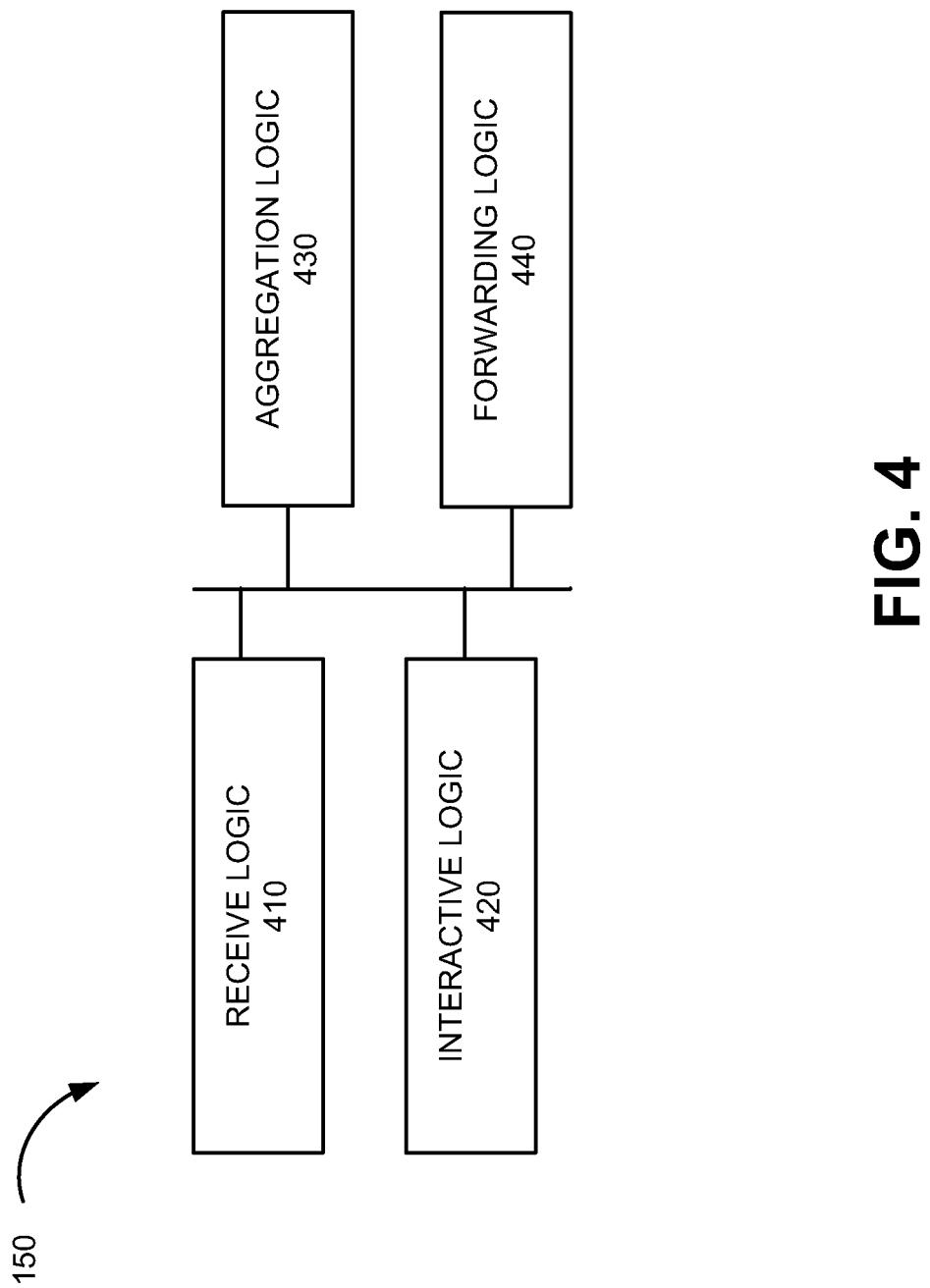
FIG. 4 illustrates an exemplary configuration of logic components implemented in another one of the components of FIG. 1.

FIG. 4 is a functional block diagram of ACD 150 according to an exemplary implementation. The logical blocks illustrated in FIG. 4 may be implemented in software, hardware, or a combination of hardware and software. For example, some or all of the logical blocks illustrated in FIG. 4 may be implemented by processor 220 executing instructions stored in memory 230. In one implementation, the logical blocks illustrated in FIG. 4 are implemented in ACD 150. It should be understood that the logical blocks illustrated in FIG. 4 may be located externally from ACD 150 in other implementations.

Referring to FIG. 4, ACD 150 may include receive logic 410, interactive logic 420, aggregation logic 430 and forwarding logic 440. Receive logic 410 may include a front end that receives information from voice portal 140 associated with calls to be distributed to agent WSs 160. For example, receive logic 410 may receive information identifying a reason for the call or a nature of the call (e.g., the caller has a question regarding connecting a wireless router for his/her Internet service). Receive logic 410 may also receive information from voice portal 140 regarding announcements to be provided to the callers. For example, receive logic 410 may receive SIP data that identifies offers or announcements to be made to the caller while the call is queued and waiting for one of the agents at WSs 160 to answer the call.

Interactive logic 420 may include speech processing logic that performs speech recognition on voice data input from a caller. For example, interactive logic 420 may receive voiced responses from a caller regarding an announcement or offer made to the caller. Interactive logic 420 may also receive and identify keypad input and/or text input from a caller regarding an offer/announcement. This information may be combined or aggregated with other information to be provided to an agent at one of agent WSs 160.

Aggregation logic 430 may receive information from receive logic 410 and/or interactive logic 420 and combine or aggregate the information for presentation to the agent WS 160. For example, aggregation logic 430 may receive information from a caller, via interactive logic 420, that indicates that the caller would like to sign up for a new service offered by the service provider. Aggregation logic 430 may combine this information with information identifying an initial reason for the call or nature of the call. Forwarding logic 440 may forward the call to one of agent WSs 160, along with aggregated data from aggregation logic 430 for presentation to the agent WS 160, as described in detail below.

Figure 5:
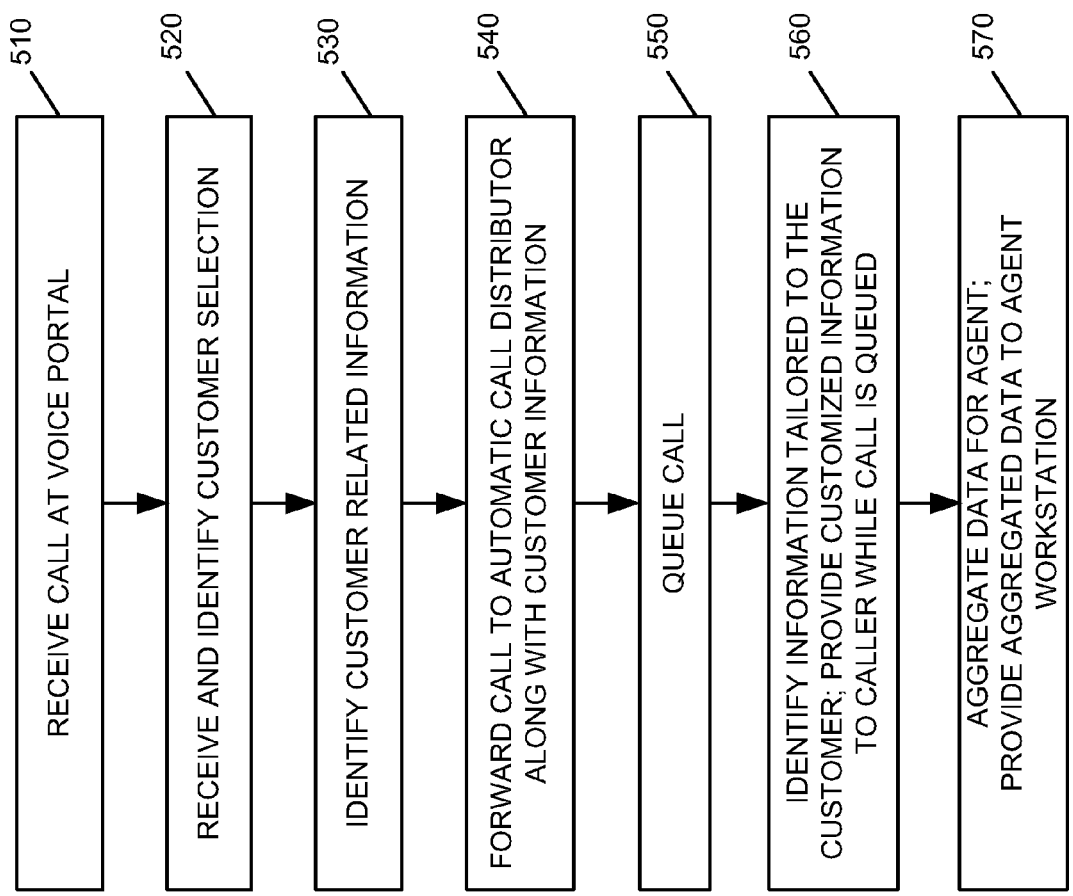
FIG. 5 is a flow diagram illustrating exemplary processing associated with the components of FIG. 1.

FIG. 5 is an exemplary flow diagram illustrating processing associated with components in network 100. Processing may begin with a caller establishing communications with voice portal 140. For example, a caller (also referred herein as a customer) at user device 110 may dial a telephone number associated with voice portal 140 or enter an Internet address associated with voice portal 140. In each case, voice portal 140 may receive the call (act 510).

Interface logic 310 may provide an automated greeting to the caller at user device 110. For example, interface logic 310 may provide a menu of options to determine the reason or nature of the call and audibly request that the caller voice or input a selection via a keypad. Interface logic 310 may also receive and identify the caller's selection (act 520). For example, speech recognition software included in voice portal 140 may identify the caller's voice selection or interface logic 310 may identify a keypad input. In some instances, interface logic 310 may interact with the caller via several different menus of options provided to the caller to attempt to identify a reason/nature of the call. In this example, assume that voice portal 140 is associated with providing services to customers, such as telephone, cable TV and/or Internet services for the caller at user device 110. Further assume that the caller has input a selection to speak to a customer agent about his/her Internet service.

Interface logic 310, as described above, may perform an ANI lookup to identify the telephone number (act 530). Retrieve logic 320 may use the telephone number as an index to database 330 to determine a name and/or address associated with the caller's telephone number. Retrieve logic 320 may then transfer the call to ACD 150 along with the identified customer information, such as the customer's name and address (act 540). This customer-related information will eventually be forwarded to one of agent WSs 160, where the agent's screen will display the customer information (e.g., the caller's name and/or address) as a screen pop. That is, the customer-related information may be automatically displayed at a display screen of agent WS 160 when the call is transferred to agent WS 160.

ACD 150 may queue the call (act 550). For example, assume that all of the agents associated with agent WSs 160 are busy helping customers. In this case, ACD 150 may queue the call. Simultaneously with the transfer of the call to ACD 150 and queuing of the call, or in some implementations, prior to queuing the call, retrieve logic 320 may access database 330 to identify additional information that may be tailored or customized to appeal to the particular customer based on the customer's profile, such as stored information associated with the customer (act 560).

For example, continuing with the example above in which the service provider associated with voice portal 140 provides telephone, cable TV and Internet services, the service provider associated with voice portal 140 may be offering a special deal on a premium movie channel, such as offering three months of free service to callers located in zip code 12345. In this case, assume that the caller at user device 110 is located in an area having the zip code 12345. Retrieve logic 320 may access database 330 and identify the service(s) currently subscribed to by the customer. In this example, assume that retrieve logic 320 determines that the customer does not currently subscribe to the premium channel HBO. Retrieve logic 320 may also access database 330 and determine that the customer is in the area having zip code 12345. In this case, retrieve logic 320 may determine that the offer is relevant to the customer and retrieve the offer information, as well as any other offer information that may be relevant to the customer. Other offers may be based on a region in which the customer resides, a current level of service provided to the customer, previous levels of service provided to the customer, length of time that the customer has subscribed to services, other characteristics associated with the customer (e.g., age, sex), etc. In each case, retrieve logic 320 may forward this information to ACD 150.

For example, retrieve logic 320 may forward a message to ACD 150 instructing ACD 150 to audibly provide the offer to the customer. In an exemplary implementation, retrieve logic 320 may provide the offer-related information to ACD 150 via SIP signaling. For example, retrieve logic 320 may send a SIP message to ACD 150 with the offer-related information being provided as SIP attached data, such as in a SIP header of the SIP message. The SIP attached data may be recognized by ACD 150 and used to identify and/or play announcements or recordings that are specific to that customer's location, the service being provided to the customer, etc.

For example, receive logic 410 or interactive logic 420 at ACD 150 may receive the information from retrieve logic 320 and audibly provide the offer to the customer while the customer's call is queued (act 560). As an example, interactive logic 420 may receive the information and provide an announcement, such as "Mr. Smith, we are currently offering a special on HBO, three months for free." Interactive logic 420 may provide additional information for accepting the offer, such as "Mr. Smith, please press 1 or say "yes" if you would like to sign up for HBO or continue to hold or press 2 to hear other promotions in your area."

Continuing with the example above, assume that customer at user device 110 hears the HBO offer and presses "1" or voices "yes." In either case, interactive logic 420 may identify the input and forward this information to aggregation logic 430. Aggregation logic 430 may aggregate the customer response information with the other information to be provided to the agent at one of agent WSs 160 (act 570). For example, aggregation logic 430 may include or combine information indicating that the customer would like to sign up for HBO with the customer's name and/or address, along with information identifying the initial reason for the call or nature of the call previously determined by interaction with the customer via voice portal 140. This aggregated information will be provided to one of agent WSs 160.

For example, assume that the call has reached the top of the queue and is ready to be forwarded to agent WS 160-2. Forwarding logic 440 may receive the aggregated data from aggregation logic 430 and forward the call along with the aggregated data to agent WS 160-2. When the call is answered by the agent at agent WS 160-2, the aggregated information may be provided or popped to the agent on a display screen associated with agent WS 160-2 (act 570). Continuing with the example above, the agent's screen at WS 160-2 may automatically display "Mr. Smith is originally calling regarding his Internet service. Mr. Smith has also signed up for the HBO offer." The agent at agent WS 160-2 may authenticate and confirm the customer's new order for HBO, as well as aid the caller regarding the initial reason for the call. In this manner, all the announcements and/or queue treatments provided to the customer may be personalized or customized based on information associated with the particular customer, as opposed to providing music or general announcements while the customer is on hold.

As another example, retrieve logic 320 may access database 330 and determine that the caller has telephone service from the service provider associated with voice portal 140, but does not have voice mail service. In this case, retrieve logic 320 may determine, via database 330, that the service provider is offering voice mail for a particular price or may be offering a special deal on voice mail service. Retrieve logic 320 may forward this information to ACD 150. Interactive logic 420 may then provide the announcement regarding the voice mail service to the caller while the call is queued, such as "Mr. Smith, I see that we have special deal on voice mail in your area for $1.99 per month for the next six months. Please say "yes" or press "1" if you like you to sign up for this offer? You could also cancel the voice mail anytime by calling 8005551212." The caller may accept the offer by voicing "yes" or pressing "1." Interactive logic 420 may receive the acceptance information and provide this information to aggregation logic 430, which may combine the acceptance information with the other customer-related information. Forwarding logic 440 may then forward the call along with the customer-related information to agent WS 160-2 for further validation or confirmation regarding acceptance of the voice mail offer.

In this manner, callers are provided with information that may be of particular interest to the caller while a call is queued/on hold. This may allow the service provider to upsell or cross-sell new products or services to the caller.

Figure 6:
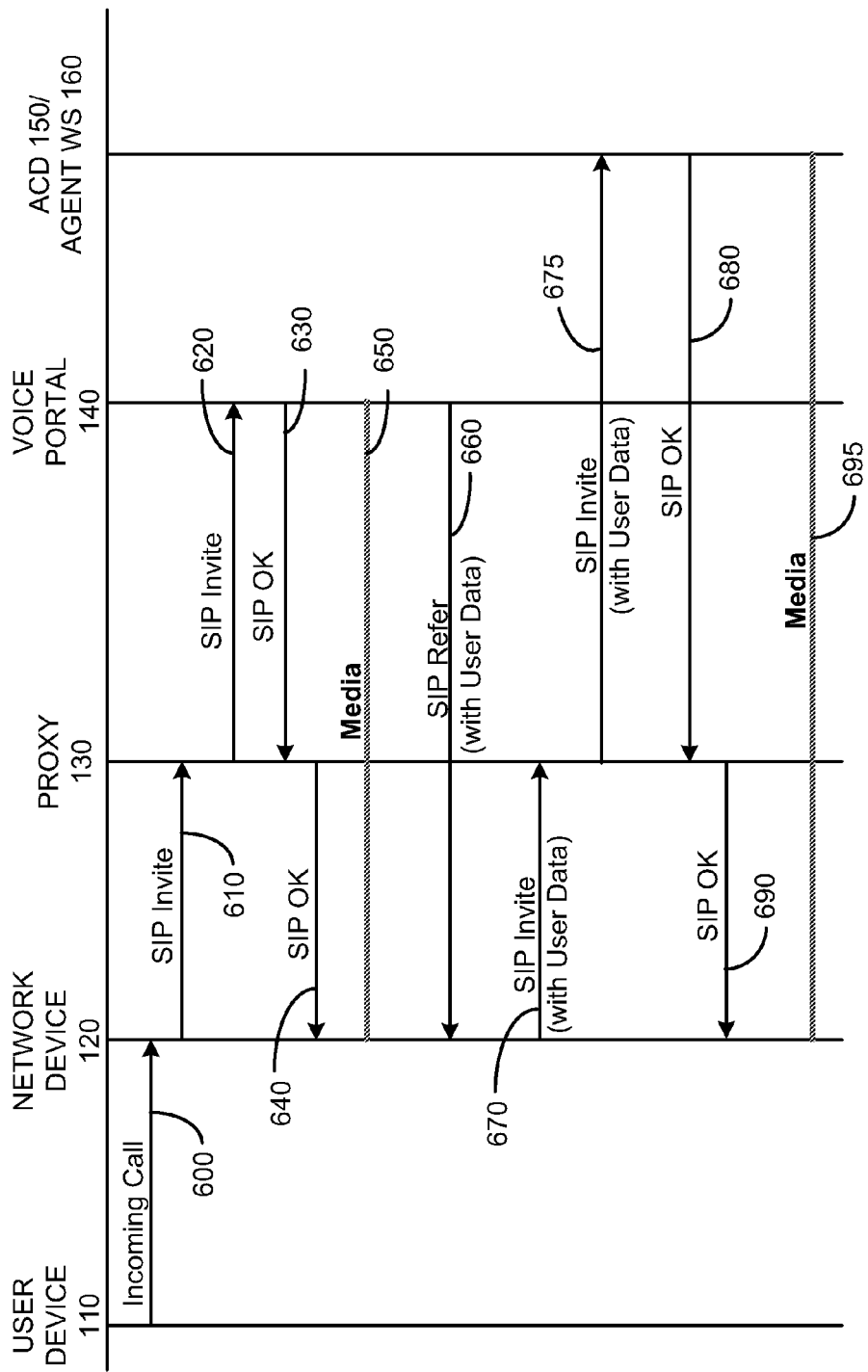
FIG. 6 is an exemplary signal flow diagram associated with processing by various devices illustrated in FIG. 1.

FIG. 6 is a call flow diagram schematically illustrating one exemplary sequence of interactions between a caller at user device 110 and other components of network 100 consistent with the processing described above with respect to FIG. 5. In this exemplary signal flow, the messaging between various devices in network 100 is performed in accordance with SIP. Initially, the caller at user device 110 places a call that is forwarded to network device 120 (600). Network device 120 may receive the call. In some instances, such as in situations where user device 110 is a plain old telephone system (POTS) phone, network device 120 may convert the call into a packet switching compatible protocol, such as an IP protocol. In other instances, such as in situations where user device 110 is a SIP telephone, network device 120 may not have to convert the call into a packet switching protocol. In either case, network device 120 may generate and forward a SIP Invite message to SIP proxy 130 (610), which forwards the SIP Invite message to voice portal 140 (620). Voice portal 140 may generate a SIP OK message and forward the SIP OK message to SIP proxy 130 (630). SIP proxy 130 may forward the SIP OK message to network device 120 (640).

A media connection is then established between the caller at user device 110 and voice portal 140 (650). IVR unit 142 at voice portal 140 may then obtain user/caller data via interaction with the caller at user device 110. For example, IVR unit 142 may determine the caller's name and/or address using ANI and accessing database 330. IVR unit 142 may also interact with the caller and determine a reason for the call. Voice portal 140 may also identify offers/announcements tailored to the particular caller, as described above. Voice portal 140 may then generate a SIP Refer message with some or all of the user/caller data and forward the SIP Refer message to network device 120 (660). The SIP Refer message may also include SIP attached data identifying announcements or offers to be made to the caller at user device 110, as described above. In some implementations, the SIP attached data identifying announcements to be made to the caller may be included in the SIP header of the SIP Refer message.

Network device 120 may then generate and forward a SIP Invite message with the user/caller data and forward the SIP Invite message to SIP proxy 130 (670). SIP proxy 130 may forward the SIP Invite message with some or all of the user/caller data to ACD 150 for eventual forwarding to an agent WS 160 (675). For example, the SIP Invite message may include SIP attached data identifying the announcements/offers to made to the caller at user device 110. In some implementations, the SIP attached data identifying announcements/offers to be made to the caller may be included in the SIP header of the SIP Invite message. ACD 150 may then forward a SIP OK message to SIP proxy 130 (680). SIP proxy 130 may forward the SIP OK message to network device 120 (690). The caller at user device 110 and the ACD 150 may then communicate via a multi-media connection (695).

For example, ACD 150 may audible provide the offers/announcements to the caller while the call is queued. In some implementations, when the call is ready to be forwarded to one of agent WSs 160, ACD 150 may forward a SIP Invite message or other type of SIP message with some or all of the user/caller data to agent WS 160. For example, the SIP Invite message or other type of SIP message may include the aggregated data described above to be provided for display at agent WS 160. The caller at user device 110 and the agent at WS 160 may then communicate via a multi-media connection (695). In this manner, agent WSs 160 receive caller data via, for example, a SIP signaling message. This enables the operator at the agent WS 160 to be able to immediately aid the caller and not query for various caller related information that may already have been obtained.

Implementations described herein provide information to callers while a call is queued based on profile information and/or other characteristic information associated with the caller. The profile information may allow the caller to receive information that is likely to be of interest to the caller while the call is waiting to be answered by an agent. In addition, based on the caller's response to the information of interest, the agent may receive additional information indicating that, for example, the user would like to order a new good or service. This allows the agent to efficiently handle the call when the call is eventually answered and may reduce average handling time for calls.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to voice portal 140 and ACD 150 interacting to provide information of interest to the caller. In other implementations, a single device, another network device or more than two devices may be involved in performing the tasks described above with respect to voice portal 140 and ACD 150.

In addition, features have been mainly described above with respect to a service provider that provides services, such as telephone, cable TV and Internet services. It should be understood that voice portal 140 may be associated with any type of merchant or service provider that may use a call center to answer calls from customers. For example, in another implementation, a caller may be calling about an order for tickets to an upcoming concert that he/she has not received. In this case, voice portal 140 may access information regarding the caller's history of ordering tickets and provide a message regarding another upcoming concert that the user may be interested in attending. For example, voice portal 140 may determine that since the caller recently purchased tickets to a rock concert by one performer, the caller may be interested in attending upcoming rock concert by a different performer. In this case, voice portal 140 may identify an announcement to be provided to the caller at user device 110 inquiring whether the caller at user device 110 would like to purchase tickets to this other rock concert.

Further, features have been described above with respect to identifying information associated with customers. In some implementations, voice portal 140 may identify information that may be relevant to parties who are not customers. For example, a caller may initially be calling voice portal 140 to inquire about purchasing a particular service. While the call is queued, voice portal 140 may provide offers/announcements based on the region in which the caller resides or other factors that may not be stored at voice portal 140 since the caller may not have already established a customer/provider relationship with the provider/merchant.

In addition, implementations described above refer to receiving voice calls. In other implementations, other types of communications, such as text-based messages, from customers may be handled in a similar manner. For example, a customer at user device 110 may access a merchant's web site requesting information regarding a particular product/service he/she has purchased. While waiting to be helped by an agent via a "chat" session or other online text-based and/or voice-based communication session, the customer may be provided with offers for additional products/services before the chat session or online session commences.

Still further, in some implementations, voice portal 140 may include logic to identify not just goods/services from the merchant/service provider associated with voice portal 140, but identify goods or services associated with other merchants/service providers. In this case, voice portal 140 may leverage one or more external databases to identify information that will likely be of interest to the caller based on a number of factors, such as the user's stored profile information.

Still further, implementations described above refer to providing offers/announcements to the caller while the call is queued. In some implementations, even if one or more agent WSs 160 are available to answer a call, ACD 150 may "queue" the call to allow ACD 150 to provide at least one announcement to the caller prior to forwarding the call to one of agent WSs 160.

In addition, while series of acts and signal flows have been described with respect to FIGS. 5 and 6, respectively, the order of the acts and signal flows may be varied in other implementations. Moreover, non-dependent acts or signal flows may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessors, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
    receiving a call from a caller;
    identifying first information associated with the caller based on the caller's telephone number or a network address associated with the caller;
    identifying, based on interaction with the caller, second information associated with a reason for the call or a nature of the call;
    queuing the call prior to forwarding the call to an agent;
    identifying third information to be provided to the caller based on stored information associated with the caller, wherein the identifying third information comprises:
        identifying a current product or service provided to the caller, wherein the current product or service corresponds to at least one of telephone, cable television or Internet service, and
        identifying, based on the current product or service, information associated with an additional or upgraded product or an additional or upgraded service associated with at least one of the caller's telephone, cable television or Internet service;
    providing the third information to the caller as an offer while the call is queued;
    receiving input from the caller accepting the offer;
    aggregating information associated with the acceptance of the offer and the second information; and
    forwarding the aggregated information to a workstation associated with the agent.

2. The method of claim 1, wherein the providing the third information comprises:
    providing an announcement for the additional or upgraded service or the additional or upgraded product to the caller.

3. The method of claim 1, further comprising:
    receiving input from the caller regarding the third information, the input indicating that the caller would like to order the additional or upgraded product or the additional or upgraded service identified by the third information; and
    providing fourth information associated with the received input to the workstation associated with the agent, the fourth information indicating that the caller would like to order the additional or upgraded product or the additional or upgraded service, wherein the fourth information comprises a portion of the aggregated information.

4. The method of claim 3, wherein the aggregating information comprises:
    combining the fourth information and the second information.

5. The method of claim 3, further comprising:
    verifying that the caller would like to order the additional or upgraded product or the additional or upgraded service.

6. The method of claim 1, wherein the identifying third information comprises:
    accessing a database that stores information identifying profile information associated with the caller, the profile information identifying at least one current or previous product or service provided to the caller, and
    identifying the third information based on the profile information.

7. The method of claim 1, wherein the receiving a call comprises:
    receiving the call at a first voice portal via session initiation protocol (SIP) signaling, and wherein the providing third information comprises:
    forwarding the call to a device along with the third information via SIP signaling.

8. The method of claim 7, wherein the network device comprises an automatic call distributor and the forwarding the call comprises:
    forwarding the third information via a SIP header of a SIP message.

9. The method of claim 1, wherein the providing the third information comprises:
    providing a self-service announcement to the caller, the self-service announcement providing instructions to the caller for accepting the offer.

10. A system, comprising:
    a memory configured to store profile information associated with a plurality of callers, wherein the profile information identifies at least one current or previous product or service provided to each of the plurality of callers; and
    at least one logic device configured to:
        receive a telephone call from a caller,
        obtain caller related data associated with the caller,
        identify first information associated with a purpose of the telephone call,
        queue the telephone call prior to forwarding the telephone call to an agent, identify a current product or service provided to the caller based on the stored profile information, identify second information to be provided to the caller based on the stored profile information and the identified current product or service provided to the caller, wherein the second information identifies an other or upgraded product or an other or upgraded service, provide the second information to the caller as an offer during a time when the telephone call is queued, receive input from the caller indicating that the caller would like to accept the offer, aggregate information associated with acceptance of the offer and the first information and, forward the aggregated information to a workstation associated with an agent selected to answer the telephone call.

11. The system of claim 10, wherein when providing the second information, the at least one logic device is configured to:

audibly provide the offer for the other or upgraded product or the other or upgraded service to the caller based on the current product or service provided to the caller.

12. The system of claim 11, wherein the current product or service provided to the caller corresponds to at least one of telephone, cable television or Internet service, and wherein when receiving input from the caller, the at least one logic device is configured to:

receive input indicating that the caller would like to accept the offer associated with at least one of the caller's telephone, cable television or Internet service.

13. The system of claim 10, wherein the at least one logic device is further configured to:

receive the telephone call via session initiation protocol (SIP) signaling, and forward the first information to a call distributor via a SIP header in a SIP signaling message.

14. A method, comprising:

receiving a call from a caller;

interacting with the caller, via an interactive voice response (IVR) unit, to identify first information associated with a reason for the call;

accessing a database storing second information associated with the caller;

identifying third information to be provided to the caller based on the stored second information;

queuing the call prior to forwarding the call to an agent;

providing, while the call is queued, the third information to the caller prior to forwarding the call to the agent, wherein the third information includes an offer associated with an additional or upgraded product or an additional or upgraded service;

receiving a response from the caller with respect to the third information; and forwarding the call and an aggregation of the first information and fourth information associated with the received response to a workstation associated with the agent.

15. The method of claim 14, wherein the providing comprises:

audibly providing the third information to the caller.

16. The method of claim 14, wherein the forwarding comprises:

forwarding the call, the first information and the fourth information using session initiation protocol (SIP) signaling or H.323 signaling.

17. The method of claim 14, wherein the identifying third information comprises identifying the third information based on a location associated with the caller.

18. The method of claim 14, wherein the third information includes an offer associated with an upgraded telephone service, an upgraded cable television service or an upgraded Internet service.

* * * * *